Dec. 14, 1948.        D. E. AUSTIN        2,456,480
STANCHION CONNECTION

Filed March 26, 1945        2 Sheets-Sheet 1

INVENTOR.
DWIGHT E. AUSTIN
BY
Bates, Teare, & McBean
ATTORNEYS

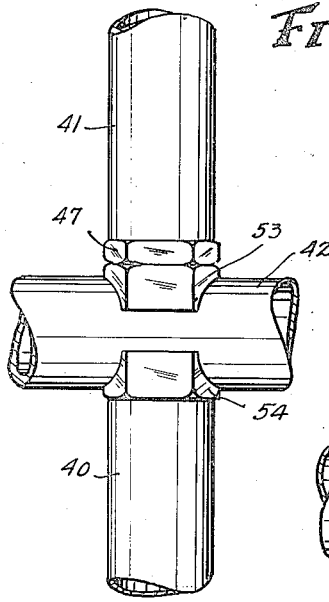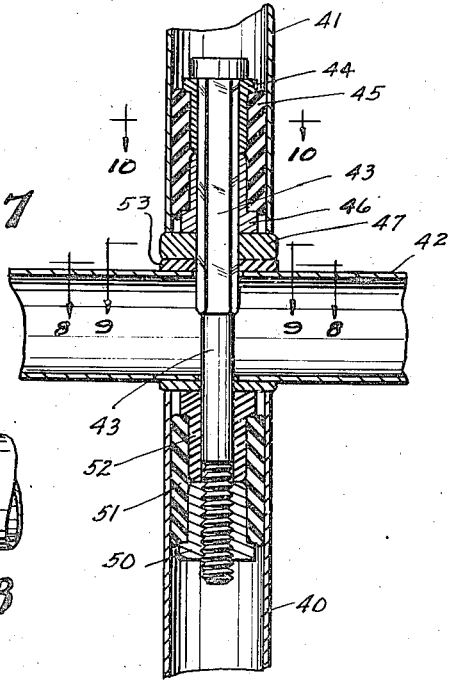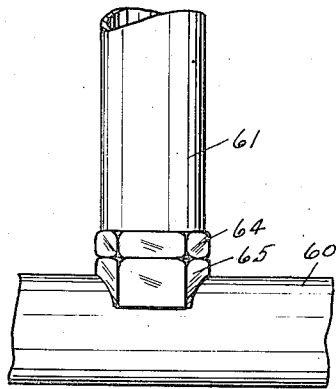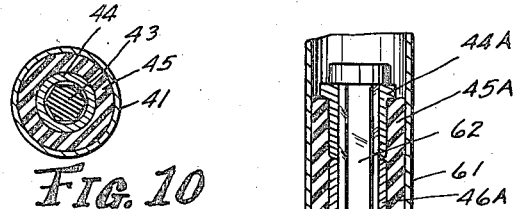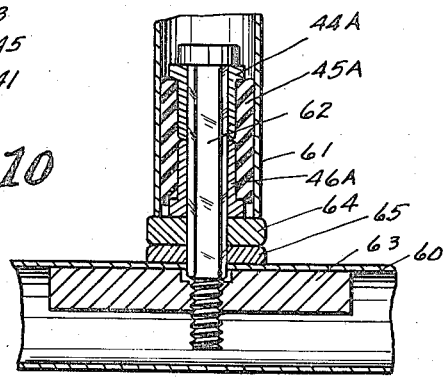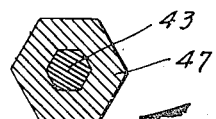

Patented Dec. 14, 1948

2,456,480

UNITED STATES PATENT OFFICE 2,456,480

STANCHION CONNECTION

Dwight E. Austin, Kent, Ohio, assignor to Samuel Moore & Company, Cleveland, Ohio, a corporation of Ohio Application March 26, 1945, Serial No. 584,977

4 Claims. (Cl. 248—351)

1

This invention relates to stanchions and particularly to means for supporting them to facilitate attachment thereof to the floor, wall and roof surfaces of a vehicle.

Where stanchions extend from the floor to the roof of a vehicle, such as a bus or streetcar, the practice heretofore has been to utilize socket members on the floor and roof surfaces for receiving the respective ends of the stanchion. In most cases the curvature or slope of the roof surface varies in different parts of the vehicle, as a result of which it has been necessary to carry in stock about one hundred different shapes of socket members to be equipped for replacing any particular stanchion. Such necessity is an expensive undertaking and is objectionable because of the frequent alterations being made in the design of the vehicle.

An object of the present invention is to make an anchoring device for a stanchion, by means of which attachment can be readily made to any slope of surface, and by means of which universal adjustment can be effected, whereby one shape of anchoring structure will suffice for all shapes of supporting surface.

An additional object of the present invention is to effect a locking engagement between the stanchion and the supporting member at each end thereof, without requiring the stanchion to be pierced for the application of a fastening member, and without using fastening devices which are exposed to view.

A further object of the invention is to make a fastening connection which will operate to effect a joint between stanchion tubes that extend at right angles to each other without necessitating the use of single or double T-couplings that necessitate splitting and threading of the stanchion and that are difficult to adjust and to replace in the event of damage to any particular section.

Figure 1:
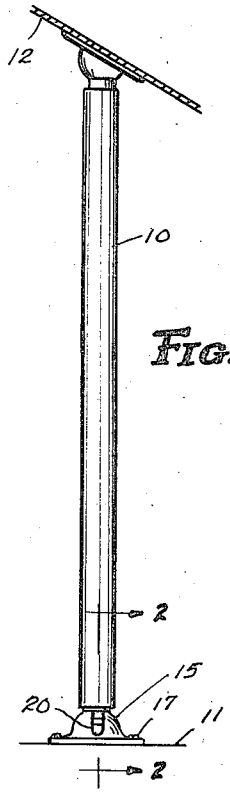
Figure 2:
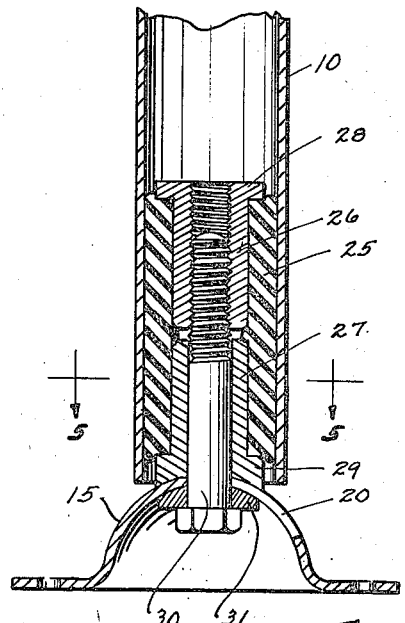
Figure 3:
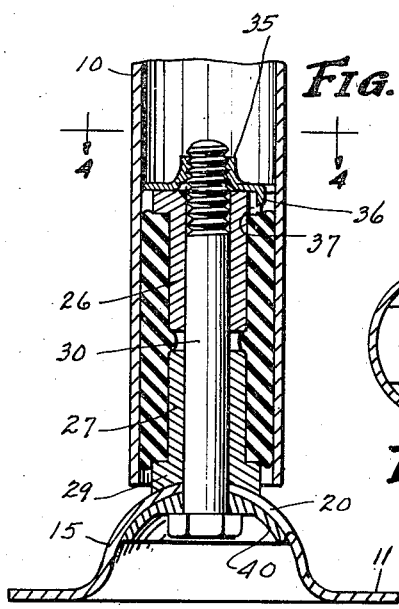
Figure 4:
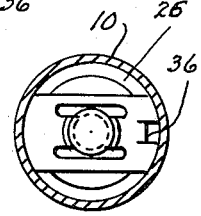
Figure 5:
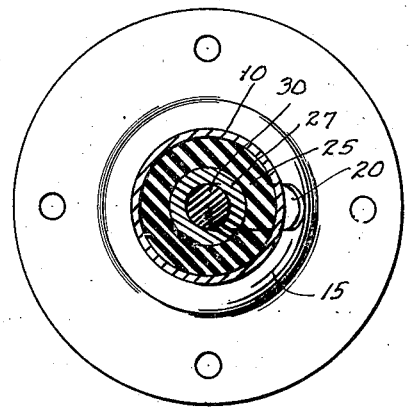

Referring now to the drawings, Fig. 1 is a view illustrating a stanchion embodying the present invention; Fig. 2 is a section taken on a plane indicated by the line 2—2 in Fig. 1; but on a scale larger than that used for Fig. 1; Fig. 3 is a sectional view similar to Fig. 2, but showing a modified form of fastening device; Fig. 4 is a section taken on a plane indicated by the line 4—4 in Fig. 3; Fig. 5 is a section taken on a plane indicated by the line 5—5 in Fig. 2; Fig. 6 is a side view showing my invention as applied for joining stanchion members that extend at right angles to each other; Fig. 7 is a section taken on a vertical axis through Fig. 6; Figs. 8, 9 and 10 are sections taken through the correspondingly numbered lines in Fig. 7; Fig. 11 is a side view illustrating two tubes connected together at right angles to each other; and Fig. 12 is a section taken vertically through the axis of the stanchions shown in Fig. 11.

The stanchion shown in Figs. 1 to 5 comprises a hollow tubular member 10, normally open at each end and adapted to extend between a floor surface 11 and a roof surface 12. The device for anchoring each end of the stanchion may be identical with that used at the other end and preferably includes a hollow substantially semi-spherical member 15 having a peripheral flange 16 that is adapted to be fastened by securing members 17 to the roof, wall or floor surface of a vehicle. The part 15 has a bolt receiving aperture therein in the form of a slot 20 which extends downwardly from the top of the curved portion to a point short of the flange, and which is wide enough to receive the bolt in all portions thereof.

To anchor the member 15 to the stanchion, I utilize a resilient bushing 25 which in its normal position may be passed freely into the tube and which is provided with a central longitudinally extending aperture for receiving opposing rigid sleeves 26 and 27 which have shoulders 28 and 29 thereon for engaging the respective ends of the bushing 25. In the form shown in Fig. 2, the sleeve 26 is threaded to receive a bolt 30, while the sleeve 27 is apertured to allow the bolt to pass freely therethrough. Additionally, the sleeve 27 has the head thereof shaped to conform to the curvature of the anchoring member 15 whereby the head has an even bearing on the part 15 regardless of the position of the bolt 30 in the slot 20. Similarly, the head of the bolt bears against the washer 31, the inner surface of which is shaped to be complementary to the inner surface of the part 15. The curved members 15 and 27 thus cooperate to make a ball and socket connection by means of which universal adjustment may be made at each end of the stanchion.

To use a stanchion and supporting means embodying the present invention, each resilient bushing and its coacting sleeves are inserted as a unit into the ends of the stanchion, the hollow parts 15 are applied and then the bolts are drawn finger tight to hold the assembly tightly in position, but sufficiently loose to permit adjustment with respect to the stanchion to suit the requirement of any desired spacing between the floor and roof surfaces. Thereupon, the bolts are tightened as a result of which the bushing 25 is forced radially against the outer surfaces of the sleeves 26 and 27 and the inner surface of the tube 10 by virtue of the force exerted axially through the shoulders 28 and 29. In making the adjustments to suit the spacing and the distance between the supporting surfaces, adjustment is also made to permit a fit between surfaces that are out of parallelism. The slotted construction of the curved member 15 provides universality of adjustment to fit any slope of surface that may be encountered in practice.

In the modification of Figs. 3 and 4, the assembly in general is the same as that shown in Fig. 2, hence, the corresponding parts have the same reference characters applied thereto. The assembly differs, however, in that the aperture in the sleeve 26 is not threaded and like that in the sleeve 27, is large enough to clear the bolt adapted to project beyond the upper end of the part 26. A sheet metal nut 35 is then adapted to coact with the threads on the bolt and is adapted to be held against rotation by means of a tongue 36 which enters a slot 37 in the shoulder 28. An additional feature of the assembly shown in Fig. 3 is the use of a curved skirt 40 on the washer 31 which extends downwardly sufficiently far to close the opening in the slot 20, and thereby prevent the entrance of dirt and other foreign matter into the space within the member 15.

The structure shown in Figs. 6 to 12, inclusive, illustrates an arrangement by means of which stanchions may be interconnected with their axes at right angles to each other without necessitating the usual exposed T or branch coupling. Thus, in Fig. 6, where the tubes 40 and 41 are connected to a cross tube 42, I utilize a bolt 43 which extends through radial openings in the tube 42 and has one end thereof disposed within the tube 40 and the other end within the tube 41. As shown in Fig. 7, the head of the bolt bears against a sleeve 44 which is circular in cross section and extends into a resilient bushing 45 from one end thereof. A coacting sleeve 46 extends into the bushing from the other end thereof bears against a collar 47. The bolt has a non-circular cross section adjacent the head end thereof and the collar has a bolt receiving aperture that is shaped complementary to the cross sectional shape of the bolt shank, as is shown more particularly in Fig. 9, whereby the bolt is nonrotatably but axially movable with respect to the collar. Thus, whenever the collar is turned the bolt is correspondingly rotated with reference to the various tubes.

The end of the bolt opposite the head is threaded for engagement with a threaded passageway in a sleeve 50 which extends into a resilient bushing 51 from one end thereof, and which coacts with a sleeve 52 that extends into the other end of the bushing for compressing the bushing axially, and thereby expanding it radially against the wall of the tube 40.

To effect a flat bearing surface for the collar 47, and the head of the sleeve 52, I have shown saddle members 53 and 54, each of which is apertured to clear the shank of the bolt and each of which has a flat bearing surface on one side for engagement with the collar 47 and the sleeve 52 respectively, and curved surfaces on the inner sides thereof for engaging the tube 42. Thus, when the parts are assembled as shown in Fig. 7, and whenever the collar 47 is turned in one direction, the bolt is advanced through the sleeve 50, whereby the sleeves 45 and 51 are expanded radially against the walls of the tubes 41 and 40 respectively, and a firm clamping action is effected therebetween.

In Figs. 11 and 12 I have shown a connection between two tubes 60 and 61, wherein the joint is made by means of a bolt 62, the head of which lies within the tube 61, and a stationary nut 63 which is threaded to receive the bolt and is disposed within the tube 60. In this arrangement, the shank of the bolt adjacent the head end thereof is non-circular in cross section and is non-rotatably but axially movable through a complementary shaped opening in a collar 64 which is positioned between the tube 61 and the saddle 65. The same arrangement of expansible resilient bushing 45A adjacent the head end of the bolt with coacting sleeves 44A and 46A, is used in this construction as is shown in Fig. 7, as a result of which the bushing is expanded against the wall of the tube 61 whenever the collar is turned to clamp the bolt to the nut 63.

A stanchion assembly embodying the present invention enables an attachment to be readily made to surfaces that are out of parallelism and enables the anchoring part to be readily adjusted axially of the stanchion without requiring the stanchion to be drilled or pierced for the reception of fastening devices, such as screws and the like. The stanchion thus presents a smooth, uninterrupted surface, replacement of which may be obtained by carrying only one shape of anchoring device in stock.

My invention, as applied to the construction of a joint between two or more tubes that have their axes at right angles to each other, is advantageuos in that threaded pipe couplings are not required, thus obviating the necessity for splitting and threading the vertically extending stanchions. The invention as so applied is advantageous in that threaded pipe couplings are tightened by means of a wrench applied exteriorly of the tube, and in that the joint enables any section to be readily replaced without disturbing a line of pipe connections.

Reference is made to my divisional application Ser. No. 702,121, filed October 9, 1946, for claims on the embodiments illustrated in Figs. 6 to 9 thereof.

I claim:

1. A device for supporting a hollow stanchion comprising a resilient bushing adapted to be disposed within the stanchion, means within the bushing adapted to expand it radially against the wall of the stanchion, said means including a ball and socket device for attaching the stanchion to a supporting surface.

2. In combination, a stanchion, a member adjacent one end thereof for attaching it to a supporting surface, a resilient bushing disposed within the stanchion, a sleeve mounted within the bushing and means including a universal joint connection for operatively connecting the sleeve to the member.

3. In combination, a tubular stanchion, a resilient bushing disposed therein and having an axially extending passageway therein, a sleeve extending into the passageway at each end of the bushing, each sleeve having a shoulder thereon adapted to engage one end of the bushing, a bolt extending into the sleeve, a hollow member disposed outside the stanchion and adjacent the end thereof, said member having an aperture for receiving said bolt and adapted to house the head of the bolt therein, said member and one of said sleeves coacting to provide a ball and socket connection by means of which the stanchion may be secured to a supporting surface in various positions of angular relationship.

4. A support for a stanchion comprising a hollow substantially hemi-spherical member, having a peripheral flange thereon and having a slot therein, a bolt having a threaded shank extending through said slot, and having a head within the hollow of the supporting member, a resilient bushing disposed between said shank and the inner wall of said stanchion and means acted upon by the bolt for exerting a clamping action of the bushing against the stanchion so as to hold it against movement with respect to said member.

DWIGHT E. AUSTIN.

REFERENCES CITED

The following references are of record in the file of this patent:

UNITED STATES PATENTS

| Number | Name | Date |
|---|---|---|
| 804,696 | Winterhoff | Nov. 14, 1905 |
| 1,782,017 | Shanks et al. | Nov. 18, 1930 |
| 1,889,978 | Dickey | Dec. 6, 1932 |
| 1,914,348 | Whitehouse | June 13, 1933 |
| 2,098,997 | Bramming | Nov. 16, 1937 |
| 2,238,561 | Goodyear | Apr. 15, 1941 |